Oct. 15, 1963  B. BEHR  3,107,166
PRESSED METAL SCRAP BRIQUETTES AND COATING PROCESS
Filed April 4, 1960
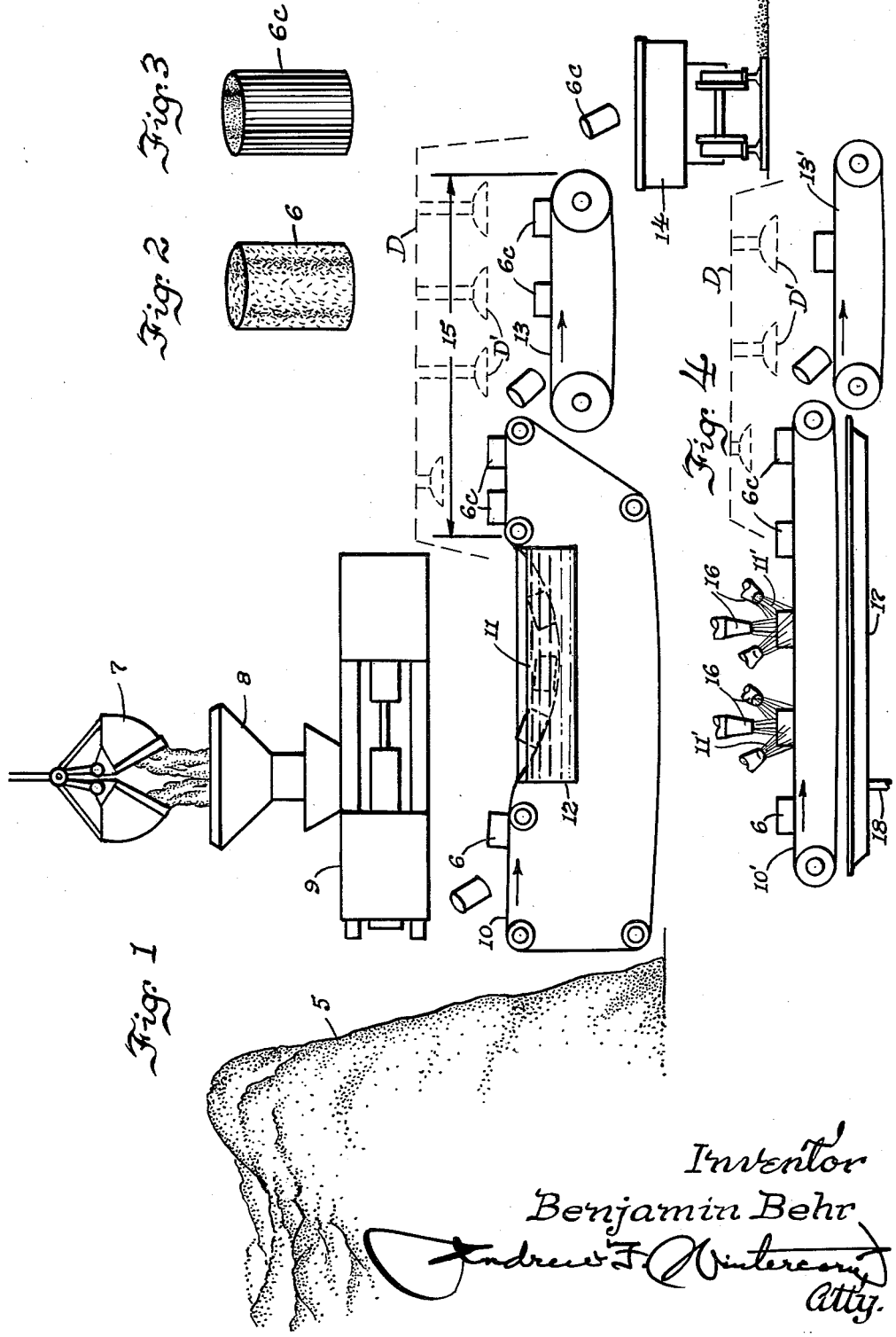

3,107,166
PRESSED METAL SCRAP BRIQUETTES AND COATING PROCESS
Benjamin Behr, Rockford, Ill., assignor to Joseph Behr & Sons, Inc., Rockford, Ill., a corporation of Illinois
Filed Apr. 4, 1960, Ser. No. 19,769
2 Claims. (Cl. 75—44)

This invention relates to the handling of ferrous and non-ferrous metal scrap such as turnings, borings, clippings, trimmings, punchings, and other small waste, in pressed briquette form, and is more particularly concerned with the coating of such briquettes to reduce, if not entirely eliminate, losses due to oxidation and physical disintegration in the handling thereof between the press operation and the ultimate firing, and also save valuable poundage in the firing of the briquettes by keeping the "fines," that would otherwise go up the stack as gas or as fly-ash, confined in one mass with the rest of the metal until they reach the lower level of the melt zone so that the whole mass becomes molten. For example, physical disintegration alone, it is estimated, has accounted for from 5% to 10% loss with the old uncoated briquettes. The loss due to oxidation of the old uncoated briquettes was also appreciable, especially when the briquettes were stored under adverse conditions, as frequently happens. The loss later in the burning of small particles in firing was also considerable when the briquettes were left uncoated. Coating with a fairly tough but relatively inexpensive plastic or other suitable material means an overall saving of 15% to 25% in tonnage of metal reclaimed with a comparatively insignificant increase in the cost of the briquettes, the coating giving the further advantage of excluding moisture which would also become an important objection when briquettes are stored in a moist place. The plastic or other non-metallic coating, furthermore, is not in the least objectionable in so far as the firing of the briquettes is concerned or in so far as the chemistry of the ultimate molten metal is concerned, because the coating represents so little volume and has a low flash point and therefore leaves no residue as it goes up in smoke and gas. Where a concern uses a special alloy, its production scrap can be kept segregated, compressed in briquettes, and coated, as herein disclosed, and sold back to this concern at an agreed profit to the processor, the concern benefitting greatly by this method of handling, because of the certainty that the metal specifications remain unchanged.

The invention is illustrated in the accompanying drawing, in which—

FIG. 1 is a more or less diagrammatic illustration of the scrap compressing and coating process and apparatus of my invention;

FIGS. 2 and 3 are perspective views of one of many possible forms and sizes of an uncoated pressed metal scrap briquette before and after the coating has been applied, respectively, and FIG. 4 is a modification of FIG. 1 showing spray means for the coating operation in lieu of the coating bath.

Similar reference numerals are applied to corresponding parts throughout the views.

Referring first to FIGS. 1 to 3, the reference numeral 5 designates a metal scrap pile made up of cast iron borings and turnings, for example, although, of course, as stated before, the present invention is applicable to all kinds of production scrap, non-ferrous and ferrous, so long as it is capable of being compressed into briquettes, one of which is shown at 6 in FIG. 2. The cylindrical form is preferred but not essential, and the size may vary considerably, anywhere from 4" up to 15" in diameter and anywhere from 1" to 12" in length. A clam-shell bucket 7 is shown in FIG. 1 as the means for conveying the scrap from the pile 5 to the hopper 8 of the hydraulic press 9, where means are provided for sifting the scrap to separate out in the hopper 8 any large objects, like wrenches and the like, which are quite apt to be found in production scrap and which could cause expensive damage to the hydraulic press. The scrap is compressed under a pressure of approximately three thousand pounds per square inch to approximately 75% of the density of cast iron, care being taken to see to it that the scrap is reasonably dry, because pockets of moisture from cutting solutions, for example, are otherwise apt to cause cracking of the briquettes due to internal pressure.

In accordance with my invention, the briquettes 6 of compressed metal scrap either drop from the press 9 onto an endless conveyor belt 10 or are otherwise conveyed thereto, and this belt moves from left to right through a bath 11 of liquid plastic or other suitable coating material provided in an elongated horizontal open top tank 12. The length of the tank and the speed of travel of the conveyor belt 10 are so related as to insure an overall coating of sufficient thickness and sufficient penetration into the briquettes to serve the purposes intended. The coated briquettes 6c, of which one is illustrated in FIG. 3, drop off the conveyor belt 10 onto another endless conveyor belt 13 which also travels from left to right and ultimately drops these briquettes, when their coatings are substantially fully dried, into a railway car 14, motor truck, or other container or conveyance. The dimension indicated at 15 for travel of the coated briquettes before delivery to the conveyance is so related to the speed of travel of the conveyor belts 10 and 13 to allow enough time for complete drying of the coating on the briquettes before final discharge. Butyrate plastic, for example, dries in from 20 to 25 seconds, and is one plastic coating material that has been found to be satisfactory for the present purposes, but, of course, a drying chamber with suitable infra red heating elements D' therein, or air circulating blowers, could be provided the length of conveyor 13, as indicated in dotted lines at D, to insure the speedier and more complete drying of the coating, so that a much wider range of coating materials could be used. Hot coating material may be used if the heating of a given coating material improves its rate of drying, especially where a drying chamber is provided, or if the heating otherwise improves its utility for the present purposes. The characteristics of the coating at present considered important so far as the present invention is concerned are that it must be:

(1) Plastic or non-metallic;
(2) Reasonably fast drying;
(3) Non-tacky;
(4) Reasonably tough and durable when dried, to resist cutting;
(5) Flexible and resilient to avoid cracking and peeling, and
(6) Have a low flash point and leave no residue in the firing of the briquetes.

The coating of plastic or other non-metallic material makes the handling of the briquettes easier or at least just as easy as when the briquettes were left uncoated but gives these advantages:

(1) Savings of from 15% to 25% in the evenual tonnage that was otherwise lost by reason of physical disintegration of the pressed metal scrap briquettes, the coating serving as a retaining envelope or container for the smaller particles that were otherwise left free to drop out before firing or burn up in firing, besides serving as a binder to hold together the larger particles at the surface that might otherwise work loose and drop off in the handling of the briquettes;

(2) The exclusion of the atmosphere means minimum oxidation, as well as the exclusion of moisture where the briquettes are stored under adverse conditions, and (3) Where the coatings are thick enough they serve as a sufficient binder to reduce losses due to cracking of the briquettes where cutting solutions, for example, set up internal pressure in the compressing of the scrap, as much of the coating material actually penetrates the briquettes to an appreciable depth.

In FIG. 4 an endless conveyor 10' is shown running from left to right to convey the briquettes 6 under and between spray nozzles 16, where the plastic or other coating material 11' is sprayed onto the briquettes from different angles and in sufficient volume to insure substantially as complete and thorough penetration and coating as in the bath 11 shown in FIG. 1, whatever surplus coating material drains off being collected in a drip receptacle 17 extending lengthwise of the conveyor 10' and therebeneath, the liquid material being drained at 18 back to a sump from which a pump delivers the material under pressure to the nozzles 16. The coated briquettes 6c dropping off the conveyor 10' are conveyed on another endles conveyor 13', similarly as in FIG. 1, during the remainder of the drying period to a suitable receptacle or conveyance, similarly as in FIG. 1.

It is believed the foregoing description conveys a good understanding of the objects and advantages of my invention. The appended claims have been drawn to cover all legitimate modifications and adaptations.

I claim:

1. An article of manufacture comprising a briquette made of small pieces of metallic scrap, such as turnings, borings, clippings, trimmings and punchings, compressed into a solid body under heavy pressure, the body being coated all over with a liquid butyrate resin which when dried forms an enclosing envelope for the briquette.

2. An article of manufacture as set forth in claim 1 wherein said butyrate resin penetrates said body for a limited depth below the surface thereof.

References Cited in the file of this patent

UNITED STATES PATENTS

| 755,777 | Howell | Mar. 29, 1904 |
| 1,303,799 | Jarvis | May 13, 1919 |
| 1,782,645 | Chichester et al. | Nov. 25, 1930 |
| 2,540,173 | Olivo | Feb. 6, 1951 |

FOREIGN PATENTS

| 126,046 | Great Britain | May 8, 1919 |